March 4, 1969 E. BRAUN ET AL 3,431,024
COAL-CUTTING TOOL
Filed March 27, 1967
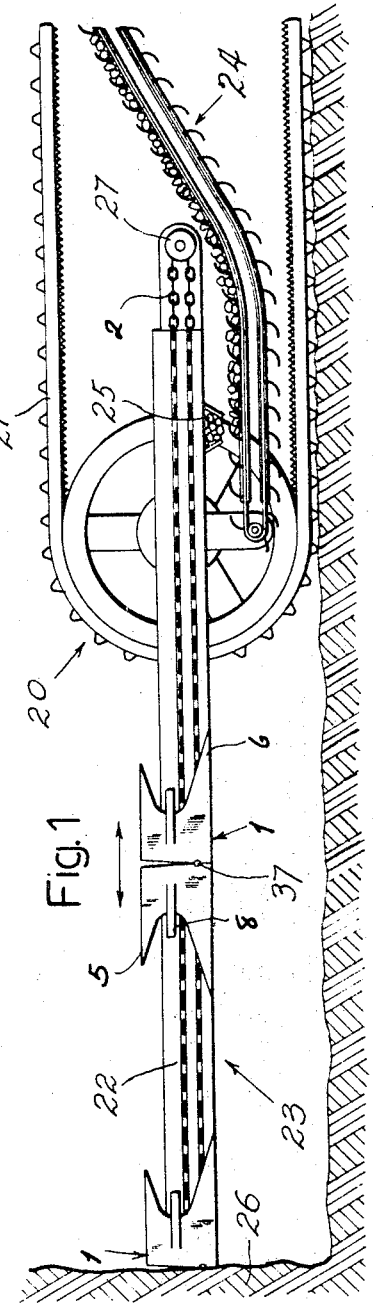
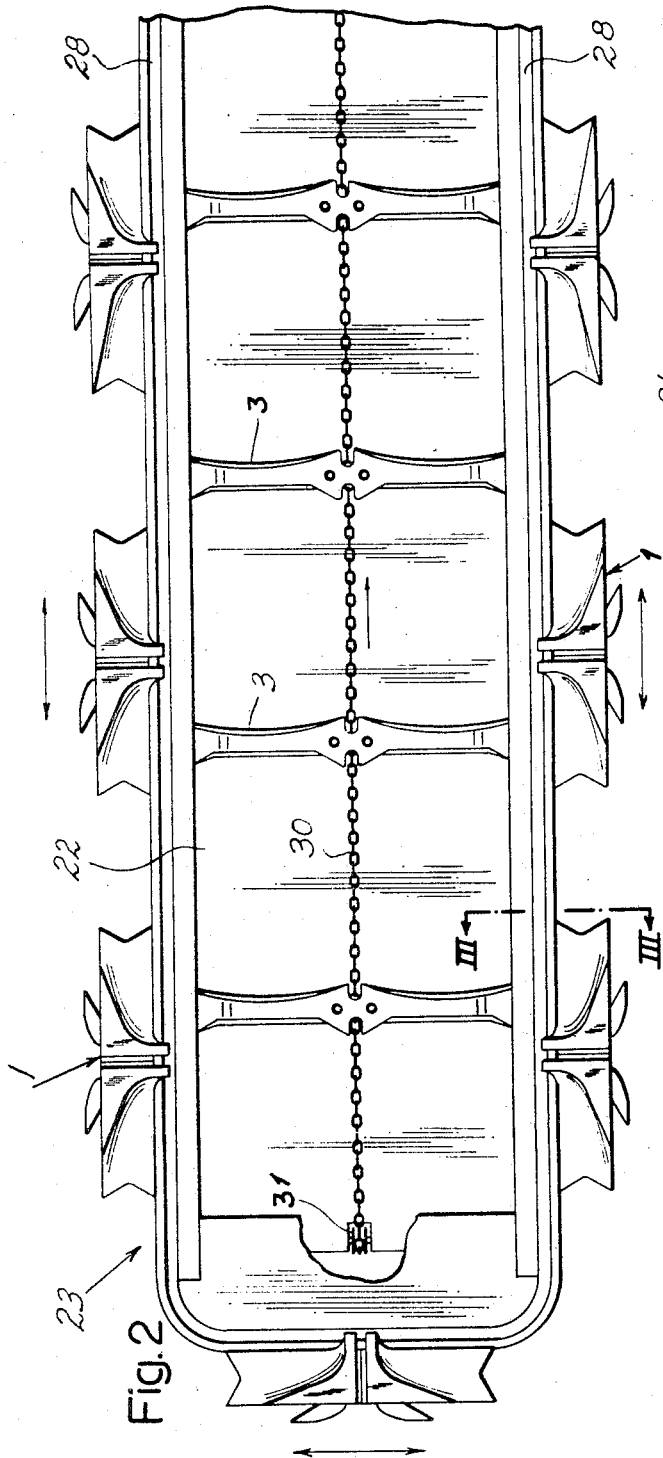
ERNST BRAUN
GERT BRAUN
INVENTORS
BY Karl F. Ross
Attorney

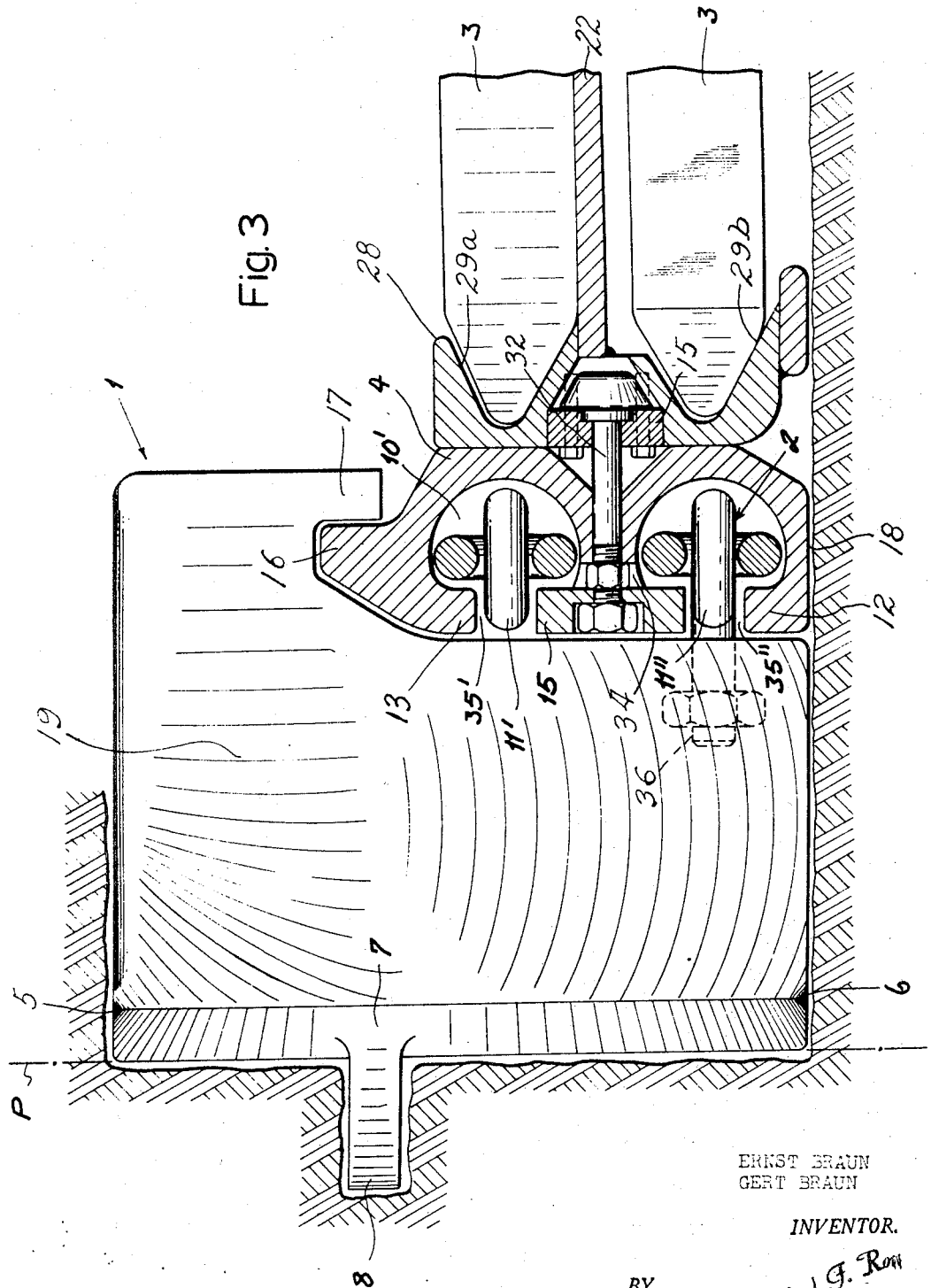

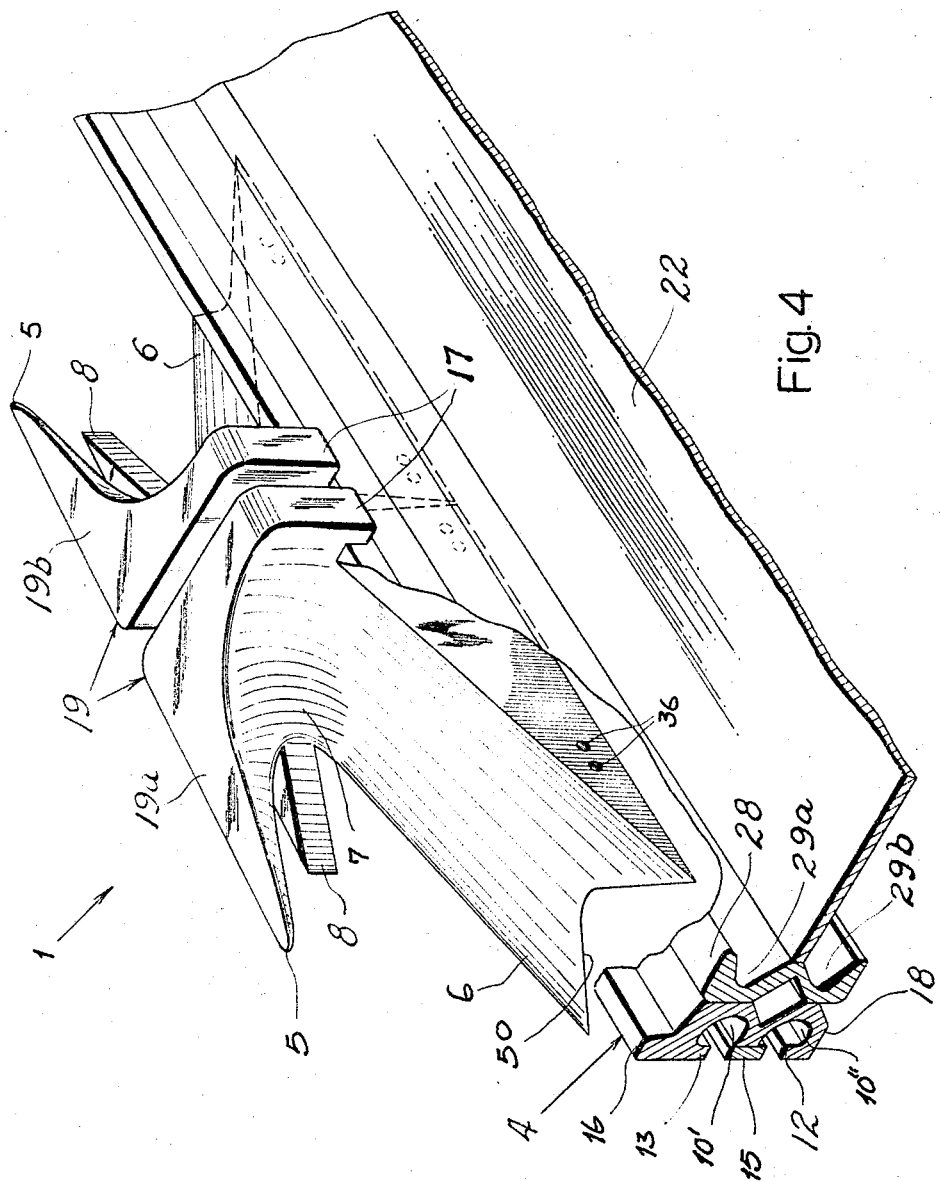

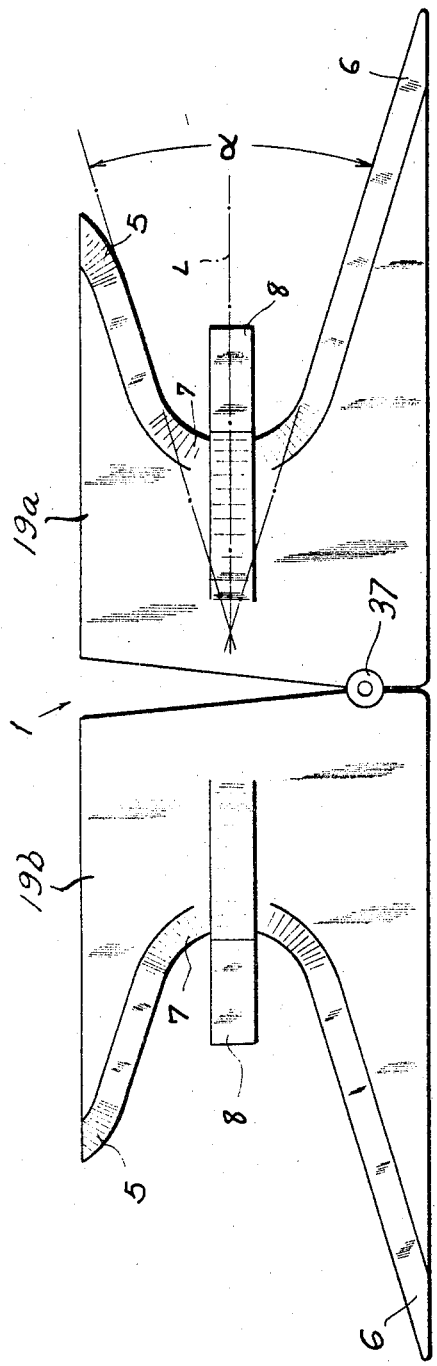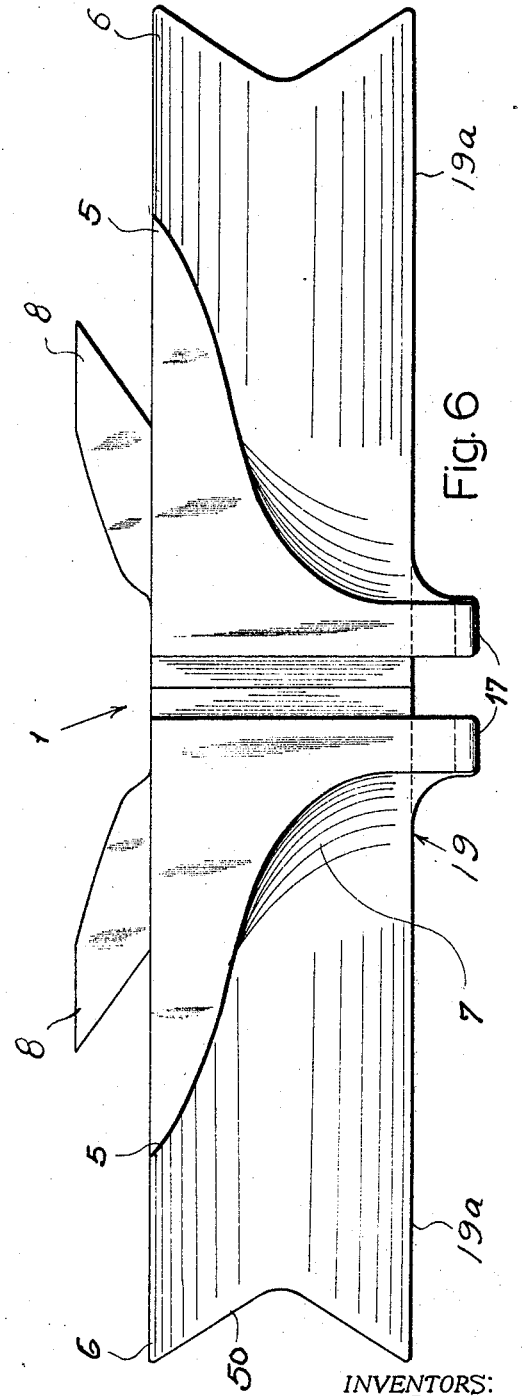

United States Patent Office 3,431,024
Patented Mar. 4, 1969

3,431,024
COAL-CUTTING TOOL
Ernst Braun and Gert Braun, Essen-Heisingen, Germany, assignors to Halbach & Braun, Maschinenfabrik, Wuppertal-Barmen, Germany, a German company
Filed Mar. 27, 1967, Ser. No. 626,060
Claims priority, application Germany, May 18, 1966, H 59,432
U.S. Cl. 299—34   10 Claims
Int. Cl. E21c 25/22

ABSTRACT OF THE DISCLOSURE

Cutting tool for the mining of minerals such as coal, comprising a lower ramp knife with a forward cutting edge and an ascending surface terminating at a throat flared to one side for laterally deflecting, onto an adjoining conveyor trough or other receptacle, mineral lumps riding up that surface; a shorter upper ramp knife extends forwardly from this throat and diverges upwardly from the ascending surface of the lower knife while curving away from the discharge side of the throat, the lateral boundaries of the two ramp knives on the side opposite the discharge side lying substantially in a common vertical plane beyond which a still shorter ripping knife projects forwardly and laterally outwardly between these boundaries. The entire assembly may be symmetrically duplicated on two halves of a tool body designed for reciprocating motion along a conveyor trough onto which the mineral lumps are to be discharged, the halves being advantageously hinged together to allow lifting of the lower knife for reducing its drag during reverse motion.

---

Our present invention relates to a cutting tool for the mining of coal and other minerals.

In such mining operations it is convenient to use an excavator which comprises a receptacle, such as a conveyor trough, along whose edge or edges one or more cutting tools are movable (e.g. reciprocable) to break chunks of coal or the like from the surrounding rock and to deposit them on the receptacle.

The general object of this invention is to provide a cutting tool of this character which performs the operation of chopping, planing and discharging onto a conveyor or the like with high efficiency and minimum expenditure of energy.

A more particular object of this invention is to provide a tool of this description which can be conveniently used for reciprocating motion, being equally effective in two directions.

A cutting tool according to our invention comprises a body with at least two ramp knives, i.e. knives with curved or inclined guiding surfaces for the chunks to be cut, these knives being bounded on one side by lateral edges which lie essentially in a common vertical plane and diverge from each other within that plane in the forward direction of the effective stroke of the tool; with a reciprocating tool, these knives will be effective only during every other stroke. The lower one of the ramp knives is generally chisel-shaped and terminates at its front end in a transverse cutting edge, a ramp surface ascending rearwardly from this cutting edge toward a throat which integrally connects the two knives and is laterally flared for discharging ascending mineral lumps toward one side, i.e. the side of an associated conveyor trough or other receptacle. The upper ramp knife is preferably shorter than the lower one and curves away from the throat toward the common vertical plane in a forward direction.

Advantageously, in accordance with a further feature of our invention, one or more a generally horizontal ripping knives are integral with the two ramp knives and project forwardly and outwardly beyond the aforementioned vertical plane for a distance less than the length of the upper ramp knife. One such ripping knife may lie substantially at the level of the upper edge of a supporting rail on which the tool is slidable, the angle of divergence of the two ramp knives being approximately bisected by that level.

The several knives may be hardened along their cutting edges or tipped with hard-metal points.

For reciprocal motion, the tool body should be divided into two symmetrical parts each equipped with a full complement of knives as described above, the parts being hinged together for limited relative motion so that particularly the drag of the lower, longer ramp knife on the underlying coal layer will be reduced during reverse motion; during the forward stroke, the wedge shape of this lower ramp knife forces it more firmly into contact with the layer surface on which it rides.

Our invention will be described in greater detail with reference to the accompanying drawing in which:

FIG. 1 is a side-elevational view (parts broken away) of a mine excavator provided with a flight conveyor according to our invention, the excavator also including features separately claimed in our concurrently filed patent applications Ser. No. 626,059 for "Scraping Conveyor" and Ser. No. 626,061 for "Mine Excavator";

FIG. 2 is a top view of a major part of the flight conveyor forming part of the excavator of FIG. 1;

FIG. 3 is a cross-sectional view taken on the line III—III of FIG. 2;

FIG. 4 is a perspective view of our improved cutting tool mounted on a supporting rail (shown partly broken away) along an edge of the conveyor of FIGS. 1-3;

FIG. 5 is a side-elevational view of the tool shown in FIG. 4; and

FIG. 6 is a top view of the same tool.

Reference will first be made to FIGS. 1-3 for a description of a mine excavator of which the present improvement forms a part.

The mine excavator shown in the drawing comprises a self-propelled vehicle 20, equipped with caterpillar tracks 21, on which there is mounted a supporting platform or apron 22 for a cutting unit generally designated 23 and a transport unit 24 in the form of a bucket-type conveyor designed to receive chunks of coal 25 from unit 23 for delivery to a repository not shown. Cutting unit 23, which digs into the coal-bearing rock 26, comprises a set of cutting tools 1 reciprocatingly driven along the edges of platform 22 by a motor (not shown) operating a sprocket 27 in engagement with an endless chain 2 to which the tools 1 are secured. Platform 22 is laterally bounded by ribs 28 which define with this platform a conveyor trough and form an endless guide track for the extremities of a series of flights 3 on a central conveyor chain 30 driven unidirectionally by a motor (not shown) on vehicle 20; the guide track has an upper run 29a and a lower run 29b respectively located above and below platform 22. The endless driving chain 30 is longitudinally looped around platform 22 by way of a pair of sprockets of which one has been shown at 31 (FIG. 2). This chain, like the reciprocating chain 2 passing along the forward and lateral edges of trough 22, 28, is therefore also divided into an upper and a lower run.

The cutting tools 1, which are designed to throw loose chunks of coal onto the upper surface of conveyor apron 22, ride on a rail 4 which bounds the conveyor trough on three sides and adjoins its ribs 28 to which it is secured with the aid of a series of bolts 32 that are anchored to inserts 33 rigid with these ribs. Rail 4 is a profiled bar whose cross-section is generally in the shape of a W laid on its side so as to form an upper and a lower channel 10', 10" respectively accommodating the upper and lower runs of chain 2; these channels are laterally open but are partly obstructed by projecting lips of the lower and upper flanges 12, 13 of the W-profile as well as by a flat strip 15 which is detachably secured, for purposes of assembly and disassembly, to the central web 34 of the profile separating the channels 10' and 10". Strip 15 and flanges 12, 13 thus define two horizontal slots 35', 35" for the guidance of alternate, i.e. horizontal, links 11', 11" of the chain 2; a bolt 36, rigid with one of the links 11", removably secures the body 19 of each tool 1 to the lower run of this chain. Tool body 19 whose lower surface is substantially flush with the underside 18 of flange 12, is divided into two symmetrical halves hingedly interconnected at 37 (FIG. 1) for limited swinging about their respective mounting bolts 36; each half forms a seating surface straddling a ridge 16 integral with flange 13 and terminating in a lug 17 which reaches around this flange to provide added support for the tool.

Each half of tool body 19 is formed with a set of cutting knives including a chisel-shaped lower ramp knife 6, a somewhat shorter upper ramp knife 5 and a still shorter ripping knife 8 located substantially on the level of upper flange 13 of rail 4. During each reciprocating stroke of chain 2, only one set of knives is effective to cut coal and to plane the seam which the unit 23 is following in the rock 26. The trailing, ineffectual set of knives may rock slightly about its pivot 37 to reduce the drag of the lower ramp knife 6. The operating knives 5 and 6 have outer boundaries which lie in a common vertical plane P and diverge in a forward direction of their effective stroke, within that plane, at an angle approximately bisected by the ripping knife 8, the latter projecting forwardly and outwardly beyond plane P. All three knives are integrally joined together at a throat 7 which is flared laterally (to the right in FIG. 3) so as to discharge oncoming pieces of rock and coal, ascending the ramp of knife 6, onto the apron 22 of the flight conveyor for entrainment by the elements 3 thereof. During each planing stroke, the working knife 6 tends to dig into the underlying coal layer to the extent permitted by the swingable suspension of the corresponding body half.

FIGS. 4–6 show in greater detail the division of the body 19 of each tool 1 into two parts 19a, 19b having a common pivot at 37.

It will be noted that the set of knives 5, 6, 8 is symmetrically duplicated on the tool halves 19a, 19b and that the lower ramp knives 6 are formed with V-shaped cutting edges 50 on the level of the underside 18 of guide rail 4. The level L of ripping knives 8 bisects the angle α of divergence of ramp knives 5 and 6 as indicated in FIG. 5. Although only one ripping knife 8 has been shown on each tool half, two or more of these knives may be disposed one above the other in the region of throat 7. The sharpened cutting edges of the knives may be specially hardened or formed from extra-hard metal.

The construction of the forwardly concave conveyor flights 3 and of the guide rails 4 for the cutting tools, disclosed but not claimed herein, is the subject matter of claims of our copending applications of even date identified above.

We claim:

1. A cutting tool for mining operations, comprising a body with a lower knife and an upper knife integrally interconnected by a curved throat and diverging forwardly from said throat, said knives being bounded on one side by lateral edges lying substantially in a common vertical plane, said lower knife having a transverse cutting edge remote from said throat and forming an ascending ramp surface extending from said cutting edge to said throat, the latter being flared toward the side remote from said lateral edges for discharging ascending mineral lumps toward the last-mentioned side.

2. A tool as defined in claim 1 wherein said upper knife curves away from said throat forwardly and toward said vertical plane.

3. A tool as defined in claim 2 wherein said lower knife is longer than said upper knife.

4. A tool as defined in claim 2, further comprising a ripping knife extending forwardly and laterally outwardly beyond said plane between said lateral edges of said upper and lower knives.

5. A tool as defined in claim 4 wherein said ripping knife extends substantially horizontally and said lateral edges diverge at an angle substantially bisected by the level of said ripping knife.

6. A tool as defined in claim 4 wherein said upper knife is longer than said ripping knife but shorter than said lower knife.

7. A tool as defined in claim 1 wherein said body consists of two halves, said upper and lower knives being symmetrically duplicated on said halves.

8. A tool as defined in claim 7 wherein said halves are pivotally interconnected for limited relative swinging about a horizontal axis.

9. In combination, a cutting tool as defined in claim 1 and a conveyor trough on the discharge side of said throat, said trough being provided with a boundary rail slidably supporting said body.

10. The combination defined in claim 9 wherein said body is provided with a ripping knife extending forwardly and laterally outwardly beyond said plane between said lateral edges of said upper and lower knives, said ripping knife lying substantially at the upper level of said boundary rail, said lateral edges diverging at an angle substantially bisected by said level.

References Cited

UNITED STATES PATENTS

| 2,539,962 | 1/1951 | Mavor | 299—32 |
| 3,164,412 | 1/1965 | Hauschopp et al. | 299—34 |

FOREIGN PATENTS

| 890,491 | 7/1949 | Germany. |
| 750,715 | 6/1956 | Great Britain. |
| 939,760 | 10/1963 | Great Britain. |

ERNEST R. PURSER, *Primary Examiner.*